United States Patent [19]
Stockstad et al.

[11] Patent Number: 5,671,375
[45] Date of Patent: Sep. 23, 1997

[54] METHOD FOR COMMUNICATING BETWEEN A MICROPROCESSOR AND AN INTERFACE CIRCUIT

[75] Inventors: Troy L. Stockstad, Phoenix; Matthew F. Bacchi, Mesa; Martin J. Brown, Scottsdale, all of Ariz.

[73] Assignee: Motorola, Inc., Schaumburg, Ill.

[21] Appl. No.: 578,763

[22] Filed: Dec. 26, 1995

[51] Int. Cl.$^6$ .................................................. G06F 13/00
[52] U.S. Cl. ............................................ 395/309; 395/306
[58] Field of Search ................................ 395/309, 306, 395/182.12, 182.22, 750, 184.01, 185.04, 185.08

[56] References Cited

U.S. PATENT DOCUMENTS 4,622,508 11/1986 Matteau et al. .
5,162,741 11/1992 Bates .
5,349,668 9/1994 Gladstein et al. .

*Primary Examiner*—Jack B. Harvey
*Assistant Examiner*—Ario Etienne
*Attorney, Agent, or Firm*—Ziye Zhou; Rennie William Dover

[57] ABSTRACT

A protocol between a microprocessor (21) and an interface circuit (11). The interface circuit (11) transmits an enable signal (124) to the microprocessor (21). Upon receiving the enable signal (124), the microprocessor (21) transmits a set of pulses of a window signal (125) to the interface circuit (11), which in turn provides the microprocessor (21) with information concerning a circuit element (36) through a data signal (127). The microprocessor (21) initiates a command by transmitting a pulse of a command signal (126) to the interface circuit (11). The interface circuit (11) accepts and executes the command only if a predetermined chronological condition between the pulse of the command signal (126) and a corresponding pulse of the window signal (125) is satisfied. The microprocessor (21) identifies a malfunctioning interface circuit (11) by timing the enable signal (124) received from the interface circuit (11).

15 Claims, 3 Drawing Sheets

100

METHOD FOR COMMUNICATING BETWEEN A MICROPROCESSOR AND AN INTERFACE CIRCUIT

BACKGROUND OF THE INVENTION

The present invention relates, in general, to a method for communicating between electronic components and, more particularly, to a method for communicating between a microprocessor and a interface circuit.

Lithium-ion batteries are preferred over other types of rechargeable batteries such as Nickel-Cadmium batteries and Nickel Metal-Hydride batteries for portable electronics applications because of their high energy density. However, a safety concern with lithium-ion batteries is that metallic lithium may plate onto one of the electrodes within the battery cell when it is overcharged. The plated lithium poses a fire hazard because of the flammable nature of metallic lithium. Another safety concern is the venting of noxious fumes when the temperature of the battery cell becomes too high. Furthermore, in an overdischarge condition, the voltage across a lithium-ion battery cell falls below an undervoltage limit, resulting in a change in the chemical composition of the electrolyte in the battery cell. Consequently, the life of the battery cell may be significantly shortened. Therefore, it is important to monitor lithium-ion batteries to ensure that they operate in their safe operating areas.

A microprocessor can be used to determine the state of a battery pack using information received from an interface circuit, e.g., a battery control unit. The interface circuit measures the parameters of the battery pack such as the voltage across each battery cell in the battery pack, the current flowing through the battery pack, the ambient temperature of the battery pack, etc. Based on the these parameters, the microprocessor determines what operations should be performed on the battery pack to ensure that the battery pack operates within a safe operating area.

Accordingly, it would be advantageous to have a method or a protocol for communicating between a microprocessor and an interface circuit that enables the microprocessor to receive information from the interface circuit as well as to control the interface circuit. It is desirable for the protocol to be simple and reliable, and to use a minimum number of signal lines. It is also desirable for the interface circuit to be able to ignore commands from a malfunctioning microprocessor and for the microprocessor to be able to identify and appropriately respond to a malfunctioning interface circuit.

DETAILED DESCRIPTION OF THE DRAWINGS

Figure 1:
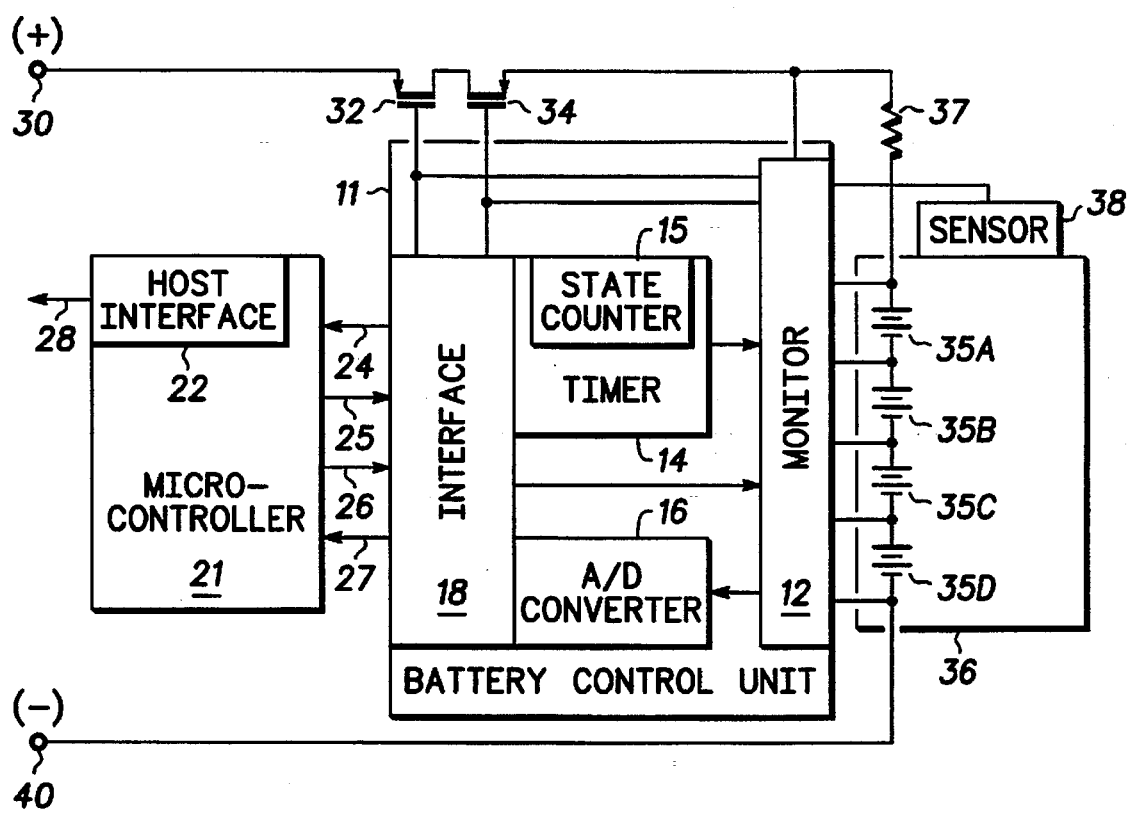
FIG. 1 is a block diagram of a battery maintenance system which uses a protocol in accordance with an embodiment of the present invention.

FIG. 1 is a block diagram of a battery maintenance system 10 which uses a protocol between a microprocessor and an interface circuit in accordance with an embodiment of the present invention. Battery maintenance system 10 is adapted to protect a battery pack 36. Battery maintenance system 10 includes a battery control unit 11, which serves as the interface circuit coupled to a microprocessor such as a microcontroller 21.

Microcontroller 21 receives status information about battery pack 36 from battery control unit 11 and initiates commands to battery control unit 11 via an enable signal line 24, a window signal line 25, a command signal line 26, and a data signal line 27. In addition, microcontroller 21 communicates with a host (not shown in FIG. 1) such as a portable computer, a cellular phone, or other electronic equipment through a host interface 22 and a serial port 28.

Battery control unit 11 keeps battery pack 36 operating in a safe operating area, sends status information about battery pack 36 to microcontroller 21, and executes the commands initiated by microcontroller 21. Battery control unit 11 includes a monitor 12, a timer 14, an analog to digital (A/D) converter 16, and an interface 18. A state counter 15 in timer 14 periodically places monitor 12 under the control of microcontroller 21 as will be discussed with reference to FIG. 2. Monitor 12 measures the parameters which are relevant to the operating conditions of battery pack 36 and keeps battery pack 36 operating within a safe operating area. As discussed supra, the relevant parameters include a current flowing through battery pack 36, a voltage across each battery cell in battery pack 36, an ambient temperature of battery pack 36, etc. By way of example, the current flowing through battery pack 36 is measured by sensing a voltage across a resistor 37, and the ambient temperature of battery pack 36 is measured by using a temperature sensor 38. A/D converter 16 converts the measured parameters into data signal pulses such as, for example, pulses whose widths are modulated. In pulse width modulated pulses, the width of a data signal pulse is proportional to the value of the corresponding parameter. Interface 18 establishes communications between battery control unit 11 and microcontroller 21.

Field effect transistors (FETs) 32 and 34 serve as switches for interrupting charging and discharging currents, respectively, flowing through battery pack 36 when the respective overcharge and overdischarge conditions develop. Because of their body diodes, FET 32 only interrupts a charging current when switched-off and FET 34 only interrupts a discharging current when switched-off. A charging current is a current flowing through battery pack 36 from a positive terminal 30 to a negative terminal 40. A discharging current is a current flowing through battery pack 36 from negative terminal 40 to positive terminal 30. It should be understood that FETs 32 and 34 serve as switches and they are not limited to being field effect transistors in the present invention. Any switching device having a control electrode and two current conducting electrodes can replace FET 32 or FET 34.

Battery pack 36 includes battery cells 35A, 35B, 35C, and 35D. It should be understood that battery pack 36 is not limited to including four battery cells as shown in FIG. 1. When the number of battery cells in battery pack 36 varies, the structure of monitor 12 and the number of pulses of the window signal transmitted through window signal line 25 will vary accordingly.

Figure 2:
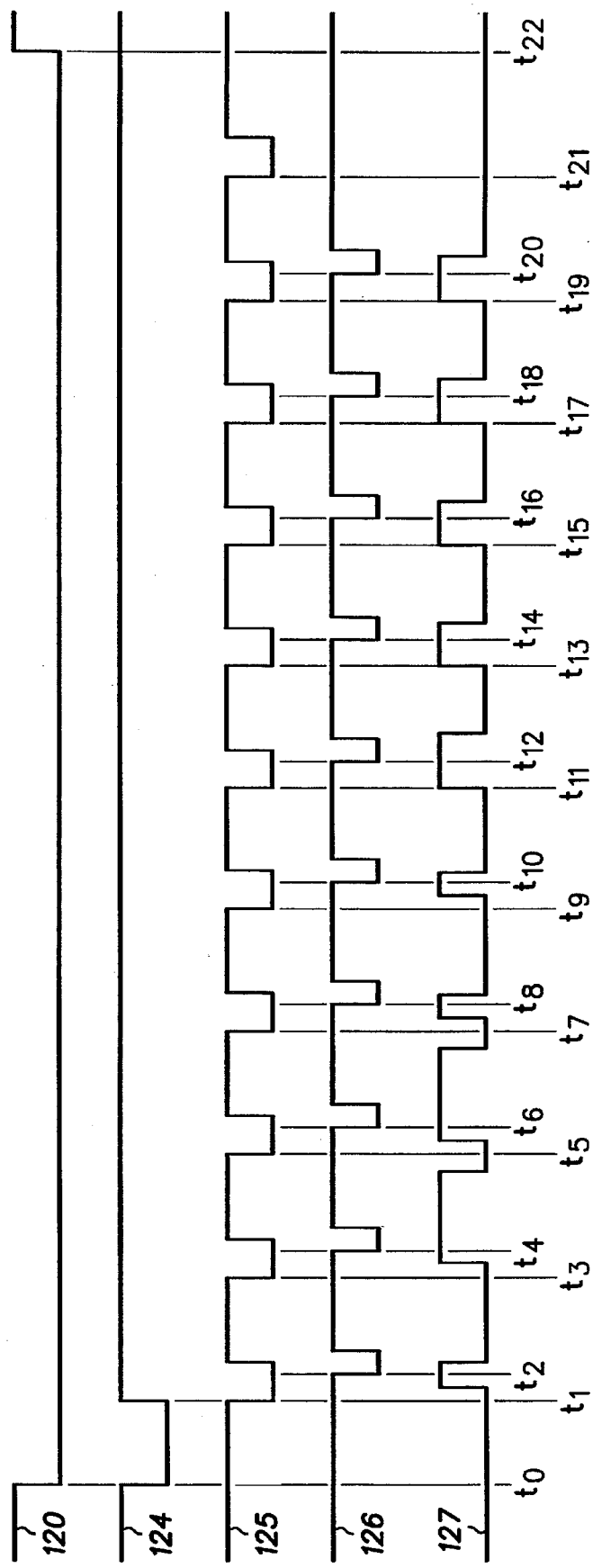
FIG. 2 is a timing diagram for the transmission of signals within the battery maintenance system of FIG. 1.

FIG. 2 is a timing diagram 100 for the transmission of signals between battery control unit 11 and microcontroller 21 within battery maintenance system 10 of FIG. 1. Timing diagram 100 illustrates the relation among an enable signal 124, a window signal 125, a command signal 126, and a data signal 127 transmitted between battery control unit 11 and microcontroller 21 via enable signal line 24, window signal line 25, command signal line 26, and data signal line 27 (shown in FIG. 1). Timing diagram 100 also shows a bit signal 120 appearing at the most significant bit of state counter 15 in timer 14 of battery control unit 11.

A primary function of battery maintenance system 10 of FIG. 1 is to insure that battery cells 35A, 35B, 35C, and 35D of battery pack 36 are operating within a safe operating area. By way of example, the safe operating area includes upper and lower limits of the voltage across each battery cell in battery pack 36, and the upper limit of the current flowing through battery pack 36. Monitor 12 periodically performs a safety monitoring operation on battery pack 36 when bit signal 120 appearing at the most significant bit of state counter 15 is at a first logic state, e.g., a logic high state. During the safety monitoring operation, monitor 12 monitors the parameters of battery pack 36 for a predetermined time interval of, for example, 100 milliseconds. If any of the safe operating limits are exceeded, monitor 12 automatically adjusts the corresponding parameters to be within their limits or terminates the condition which causes the corresponding parameters to exceed their safe operating limits. The safety monitoring operations of monitor 12 are described in more detail in co-pending U.S. patent application Ser. No. 08/398,255, entitled "CIRCUIT AND METHOD FOR BATTERY CHARGE CONTROL", filed on Mar. 3, 1995, by Troy L. Stockstad et al. and assigned to the same assignee, Motorola, Inc., and which is hereby incorporated herein by reference.

For example, if an overcharge condition is detected, FET 32 is switched off and, if necessary, monitor 12 performs battery cell balancing operations on battery pack 36. If an overdischarge condition is detected, FET 34 is switched off, and battery maintenance system 10 enters a hibernation state characterized by an extremely low power consumption. Battery maintenance system 10 wakes up, i.e., leaves the hibernation state, and returns to its normal operating state when a current flowing into positive terminal 30 is detected. If an overcurrent condition is detected, either FET 32 or FET 34 is switched off to terminate the overcurrent condition. It should be noted that FET 32 is switched off if the overcurrent is flowing into battery pack 36 through positive terminal 30 and FET 34 is switched off if the overcurrent is flowing away from battery pack 36 through positive terminal 30.

When bit signal 120 appearing at the most significant bit of state counter 15 switches to a second logic state, e.g., a logic low state, enable signal 124 is switched to a logic low voltage level. This occurs at time $t_0$ as shown in timing diagram 100. The falling edge of enable signal 124 is transmitted through enable signal line 24 to an interrupt request pin (not shown in FIG. 1) of microcontroller 21 and alerts microcontroller 21 that battery control unit 11 is under its control. Battery control unit 11 stays under the control of microcontroller 21 until bit signal 120 switches back to the logic high state at time $t_{22}$. By way of example, bit signal 120 has a period of one second and switches between the two logic states every 0.5 second. A timer (not shown in FIG. 1) in microcontroller 21 tracks the time and notifies microcontroller 21 when battery control unit 11 is no longer under its control. Alternatively, enable signal 124 is designed to switch to a logic high state at time $t_{22}$ to notify microcontroller 21 that battery control unit 11 has started performing the safety monitoring operations and is no longer under the control of microcontroller 21.

If microcontroller 21 does not receive a falling edge of enable signal 124 at a predetermined point in each period of bit signal 120, the timer (not shown in FIG. 1) in microcontroller 21 alerts microcontroller 21 that battery control unit 11 is malfunctioning. In response to a malfunctioning battery control unit 11, microcontroller 21 shuts down battery maintenance system 10 to protect battery pack 36. Alternative actions taken by microcontroller 21 for protecting battery pack 36 include starting a reinitialization procedure on battery maintenance system 10, triggering a silicon control rectifier to open a fuse (not shown in FIG. 1) in a series connection with battery pack 36, or the like. These features guarantee that battery pack 36 operates in a safe operating area.

Between times $t_1$ and $t_{22}$, microcontroller 21 transmits window signal 125 to battery control unit 11 via window signal line 25. Window signal 125 comprises a series of pulses, wherein each pulse causes monitor 12 to proceed to a next state and to measure a parameter of battery control unit 11 or battery pack 36. By way of example, there are eleven pulses of window signal 125 in a microcontroller cycle of microcontroller 21.

At time $t_1$, a falling edge of a first pulse of window signal 125 is transmitted to battery control unit 11. The falling edge of the first pulse of window signal 125 indicates the start of a microcontroller cycle and signals monitor 12 to measure a reference voltage of battery control unit 11. A/D converter 16 generates a first pulse of data signal 127 using the measured value of the reference voltage. By way of example, data signal 127 is a pulse width modulated signal and, therefore, the width of the first pulse of data signal 127 is proportional to the measured value of the reference voltage. It should be noted that the widths of the pulses of data signal 127 are individually modulated in accordance with the parameters measured and, therefore, they may be different from each other. The first pulse of data signal 127 is transmitted to microcontroller 21 via data signal line 27.

At time $t_3$, a falling edge of a second pulse of window signal 125 is transmitted to battery control unit 11 and signals monitor 12 to measure a charging current flowing through battery pack 36 using a low gain amplifier (not shown in FIG. 1). A/D converter 16 generates a second pulse of data signal 127 in accordance with the measured value of the charging current.

At time $t_5$, a falling edge of a third pulse of window signal 125 is transmitted to battery control unit 11 and signals monitor 12 to measure a charging current flowing through battery pack 36 using a high gain amplifier (not shown in FIG. 1). A/D converter 16 generates a third pulse of data signal 127 in accordance with the measured value of the charging current.

At time $t_7$, a falling edge of a fourth pulse of window signal 125 is transmitted to battery control unit 11 and signals monitor 12 to measure a discharging current flowing through battery pack 36 using a low gain amplifier (not shown in FIG. 1). A/D converter 16 generates a fourth pulse of data signal 127 in accordance with the measured value of the discharging current.

At time $t_9$, a falling edge of a fifth pulse of window signal 125 is transmitted to battery control unit 11 and signals monitor 12 to measure a discharging current flowing through battery pack 36 using a high gain amplifier (not shown in FIG. 1). A/D converter 16 generates a fifth pulse of data signal 127 in accordance with the measured value of the discharging current.

At time $t_{11}$, a falling edge of a sixth pulse of window signal 125 is transmitted to battery control unit 11 and signals monitor 12 to measure the ambient temperature of battery pack 36 using temperature sensor 38. A/D converter 16 generates a sixth pulse of data signal 127 in accordance with the measured value of the temperature.

At time $t_{13}$, a falling edge of a seventh pulse of window signal 125 is transmitted to battery control unit 11 and signals monitor 12 to measure a voltage across battery cell 35A of battery pack 36. A/D converter 16 generates a seventh pulse of data signal 127 in accordance with the measured value of the voltage across battery cell 35A.

At time $t_{15}$, a falling edge of an eighth pulse of window signal 125 is transmitted to battery control unit 11 and signals monitor 12 to measure a voltage across battery cell 35B of battery pack 36. A/D converter 16 generates an eighth pulse of data signal 127 in accordance with the measured value of the voltage across battery cell 35B.

At time $t_{17}$, a falling edge of a ninth pulse of window signal 125 is transmitted to battery control unit 11 and signals monitor 12 to measure a voltage across battery cell 35C of battery pack 36. A/D converter 16 generates a ninth pulse of data signal 127 in accordance with the measured value of the voltage across battery cell 35C.

At time $t_{19}$, a falling edge of a tenth pulse of window signal 125 is transmitted to battery control unit 11 and signals monitor 12 to measure a voltage across battery cell 35D of battery pack 36. A/D converter 16 generates a tenth pulse of data signal 127 in accordance with the measured value of the voltage across battery cell 35D.

At time $t_{21}$, a falling edge of an eleventh pulse of window signal 125 is transmitted to battery control unit 11. The eleventh pulse of window signal 125 is a terminating pulse which indicates the end of the current microcontroller cycle.

It should be understood that battery control unit 11 is not limited to being triggered by the falling edge of window signal 125. The present invention also applies to an interface circuit which is triggered by the rising edge of window signal 125. It should also be understood that the number of pulses of window signal 125 in a microcontroller cycle is not limited to being eleven as shown in timing diagram 100 of FIG. 2. The number of pulses of window signal 125 in a microcontroller cycle corresponds to the number of states monitor 12 goes through during the microcontroller cycle. Furthermore, microcontroller 21 is not limited to initiating one microcontroller cycle between times $t_0$ and $t_{22}$. If time permits, microcontroller 21 can sequentially initiate a plurality of microcontroller cycles.

Depending on the information received from battery control unit 11 via data signal line 27 and commands received from the host (not shown in FIG. 1) via serial port 28 and host interface 22, microcontroller 21 may or may not initiate a command during a microcontroller cycle. If microcontroller 21 does not initiate a command during the microcontroller cycle, command signal 126 stays at a first logic voltage level, e.g., a logic high voltage level, throughout the microcontroller cycle.

To initiate a command during a microcontroller cycle between times $t_1$ and $t_{21}$, microcontroller 21 first initiates an unlock command by transmitting a falling edge of a pulse of command signal 126 to battery control unit 11 at time $t_2$. Circuitry in battery control unit 11 detects the chronological relation of time $t_2$ with respect to the first pulse of window signal 125, and unlocks a command interface circuit (not shown in FIG. 1) in interface 18 of battery control unit 11 only if time $t_2$ falls between the falling edge and the rising edge of the first pulse of window signal 125 in the current microcontroller cycle. By way of example, a pulse of window signal 125 has a time duration between the falling and rising edges of 200 micro-seconds (µs). If time $t_2$ falls outside the 200 µs time duration of the first pulse of window signal 125, the command interface circuit in interface 18 of battery control unit 11 remains locked and battery control unit 11 ignores any subsequent commands initiated by microcontroller 21 in the corresponding microcontroller cycle.

Once the command interface circuit in interface 18 of battery control unit 11 is unlocked, microcontroller 21 can initiate additional commands by transmitting additional pulses of command signal 126. Each command corresponds to a pulse of command signal 126. Circuitry in battery control unit 11 detects the chronological relation of a pulse of command signal 126 with respect to a corresponding pulse of window signal 125. Battery control unit 11 accepts a command associated with a pulse of command signal 126 only if the falling edge of the command signal pulse falls between the falling and rising edges of the corresponding pulse of window signal 125 and the rising edge of the command signal pulse is after the rising edge of the corresponding pulse of window signal 125. Thus, battery control unit 11 accepts a command assigned to a pulse of command signal 126 corresponding to the second pulse of window signal 125 only if time $t_4$ falls between the falling and rising edges of the second pulse of window signal 125 beginning at time $t_3$ and the rising edge of the command signal pulse is after the rising edge of the second pulse of window signal 125. The same condition applies to pulses of command signal 126 at times $t_6$, $t_8$, $t_{10}$, $t_{12}$, $t_{14}$, $t_{16}$, $t_{18}$, and $t_{20}$ with respect to their corresponding pulses of window signal 125. By accepting a command only if the chronological relation between the corresponding pulses of command signal 126 and window signal 125 is satisfied, battery control unit 11 ignores commands that may originate from a malfunctioning microcontroller 21. At time $t_{21}$, the falling edge of the terminating pulse of window signal 125 signals battery control unit 11 to relock the command interface circuit in interface 18. Although command signal 126 is described as having ten pulses in a microcontroller cycle, it is not intended as limitation of the present invention. Depending on the number of pulses of window signal 125 in the microcontroller cycle, there may be any number of pulses of command signal 126 in the microcontroller cycle.

It should be understood that battery control unit 11 is not limited to being triggered by a low pulse of command signal 126. The present invention also applies to an interface circuit which is triggered by a high pulse of command signal 126. It should also be understood that it is not necessary to assign a command to each pulse of command signal 126. In the example described with reference to FIG. 2, microcontroller 21 initiates up to six commands in a microcontroller cycle. The six commands are interrupting a charging current flowing through battery pack 36, interrupting a discharging current flowing through battery pack 36, and establishing current paths for discharging battery cell 35A, 35B, 35C, and 35D. Because the pulse of command signal 126 which has its falling edge at time $t_2$ is assigned to unlocking the command interface circuit (not shown in FIG. 1) in interface 18, there are nine pulses of command signal 126 in a microcontroller cycle available for command assignment. In one command assignment configuration, the pulses of command signal 126 which have their falling edges at times $t_4$, $t_8$, and $t_{12}$ are not associated with any command, the pulses of command signal 126 which have their falling edges at times $t_6$ and $t_{10}$ are assigned to the commands of switching off FET 32 and FET 34, respectively, and the pulses of command signal 126 which have their falling edges at times $t_{14}$, $t_{16}$, $t_{18}$, and $t_{20}$ are assigned to the commands of establishing discharging paths for battery cells 35A, 35B, 35C, and 35D, respectively.

At time $t_{22}$, bit signal 120 switches to the logic high state. Battery control unit 11 performs the safety monitoring operation and starts to execute the commands it accepted when bit signal 120 was at the logic low state. If an overcharge or an overdischarge condition is detected, battery control unit 11 switches off FET 32 or FET 34, respectively, regardless of the commands of microcontroller 21. As a safety procedure, a command initiated by microcontroller 21 and accepted by battery control unit 11 is executed only for a time interval equal to the period of bit signal 120. After bit signal 120 switches to the logic low state and back to the logic high state during the next period of bit signal 120, all commands that battery control unit 11 is executing in the present period of bit signal 120 will be terminated. Therefore, any potentially hazardous operating condition is interrupted.

For example, during a first time interval with bit signal 120 at a logic low state, battery control unit 11 is under the control of microcontroller 21. A falling edge of a pulse of command signal 126 is transmitted to battery control unit 11 between the falling and rising edges of seventh pulse of window signal 125 and a rising edge of the pulse of command signal 126 is transmitted to battery control unit 11 after the rising edge of the seventh pulse of window signal 125. Upon receiving the pulse of command signal 126, battery control unit 11 accepts the command of establishing a discharging path for battery cell 35A. When bit signal 120 switches to a logic high state at the end of the first time interval, monitor 12 establishes a discharging path for battery cell 35A. When bit signal 120 switches back to the logic low state, battery control unit 11 is once again under the control of microcontroller 21. During this second time interval, battery control unit 11 may accept additional commands initiated by microcontroller 21. When bit signal 120 switches to a logic high state at the end of the second time interval, monitor 12 interrupts the discharging path for battery cell 35A, which was established through a command initiated by microcontroller 21 and accepted by battery control unit 11 during the first time interval, and executes the commands initiated by microcontroller 21 and accepted by battery control unit 11 during the second time interval.

Figure 3:
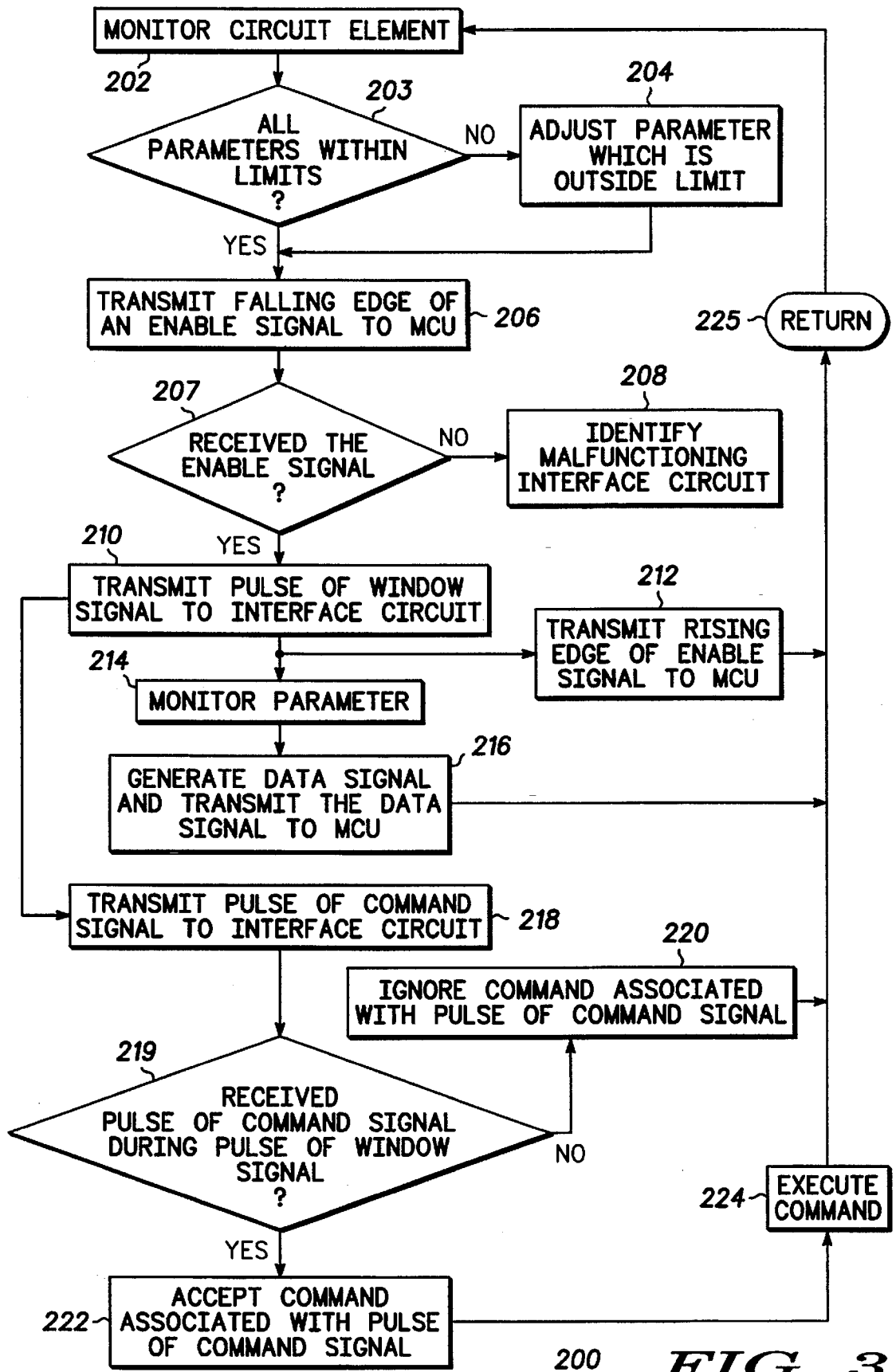
FIG. 3 is a flow chart of a protocol for use with the battery maintenance system of FIG. 1.

FIG. 3 is a flow chart 200 of a protocol or a method for communicating between a microcontroller (MCU), e.g., microcontroller 21 in FIG. 1, and an interface circuit, e.g., battery control unit 11 in FIG. 1. By way of example, the protocol is adapted to control a circuit element such as battery pack 36 in FIG. 1. A timer in the microcontroller (MCU) and a timer in the interface circuit are used to track time and control the period of the protocol 200. It should be understood that the protocol described in flow chart 200 is not limited to being adapted to control a battery pack. The protocol is adaptable to control other circuit element such as an automotive engine, a testing equipment, or the like.

The protocol starts with the interface circuit monitoring a set of parameters of the circuit element (step 202). The set of parameters is compared with a corresponding set of predetermined limits for the parameters (step 203). If any parameter is outside its corresponding limit, the interface circuit adjusts the parameter which is outside its corresponding limit (step 204).

Subsequently, a falling edge of an enable signal is transmitted from the interface circuit to an interrupt request pin of the microcontroller (MCU) (step 206). The falling edge of the enable signal alerts the microcontroller (MCU) that the interface circuit is now under the control of the microcontroller (MCU). The timer in the microcontroller (MCU) tracks the time when the microcontroller (MCU) receives the falling edge of the enable signal (step 207). If the microcontroller (MCU) does not receive the falling edge of the enable signal at a predetermined time, the timer in the microcontroller (MCU) alerts the microcontroller (MCU) that the interface circuit is malfunctioning (step 208). In response to a malfunctioning interface circuit, the microcontroller (MCU) takes an appropriate action such as, for example, switching off the circuit, to protect the circuit element.

In response to the microcontroller receiving the falling edge of the enable signal at a predetermined time, the microcontroller (MCU) transmits a pulse of a window signal to the interface circuit (step 210). The window signal is a pulse and therefore includes a falling edge followed by a rising edge. In response to the falling edge of the window signal, the interface circuit transmits a rising edge of the enable signal to the interrupt request pin of the microcontroller (MCU) (step 212). In addition, the interface circuit monitors a parameter indicating the operating condition of the circuit element (step 214). An analog to digital converter in the interface circuit generates a data signal in accordance with the measured value of the monitored parameter, and the data signal is then transmitted to the microcontroller (MCU) (step 216).

In response to the microcontroller (MCU) initiating a command, a pulse of a command signal is transmitted from the microcontroller (MCU) to the interface circuit (step 218). The chronological relation between the command signal pulse transmitted in step 218 and the window signal pulse transmitted in step 210 is examined (step 219). If the leading edge of the command signal pulse falls outside the falling and rising edges of the window signal pulse, the interface circuit ignores a command associated with the command signal pulse (step 220).

In response to the leading edge of the command signal pulse falling between the falling and rising edges of the window signal pulse, the interface circuit accepts the command associated with the command signal pulse (step 222). The interface circuit then executes the command accepted by the interface circuit for a time interval equal to the period of the protocol (step 224).

In step 225, the microcontroller (MCU) and the interface circuits return to the states they were in before performing step 202 of the protocol.

It should be understood that each step of steps 210, 214, 216, 218, 219, 220, and 222 is not limited to being performed once in a time interval between steps 206 and 225. Depending on the parameters of the circuit element to be monitored, and the commands to be initiated by the microcontroller (MCU) and executed by the interface circuit, steps 210, 214, 216, 218, 219, 220, and 222 can be performed any number of times between steps 206 and 225. For example, in a protocol adapted to protect a battery pack, steps 210, 214, 216, and 218 are performed eleven times between steps 206 and 225 as described with reference to FIGS. 1 and 2.

Although a battery control unit is used as an example of the interface circuit, this is not intended as a limitation of the present invention. The present invention is applicable in any area in which a microprocessor is used to control the operation of the system. For example, the present invention is applicable in the areas of automotive engine control, electronic testing, or the like.

By now it should be appreciated that a method for communicating between a microprocessor and an interface circuit has been provided. The method of the present invention provides a simple protocol that enables the microprocessor to receive information from the interface circuit and to control the interface circuit using a minimum number of signal lines between the microprocessor and the interface circuit. Therefore, the size of the system using the protocol in accordance with the present invention can be minimized. Because of the safety features incorporated in the protocol, the interface circuit of the present invention can ignore commands from a malfunctioning microprocessor. In addition, the microprocessor can identify a malfunctioning interface circuit. Therefore, the present invention provides a means for guaranteeing the safe operation of a system.

We claim:

1. A method for communicating between a microprocessor and an interface circuit, comprising the steps of:

transmitting a first edge of an enable signal to the microprocessor;

transmitting a first edge of a first pulse of a window signal to the interface circuit in response to the microprocessor receiving the first edge of the enable signal;

transmitting a second edge of the first pulse of the window signal to the interface circuit;

transmitting a first data signal to the microprocessor in response to the interface circuit receiving the first edge of the first pulse of the window signal;

transmitting a first pulse of a command signal to the interface circuit in response to the microprocessor initiating a first command; and executing the first command in response to the interface circuit receiving the first pulse of the command signal after receiving the first edge of the first pulse of the window signal and before receiving the second edge of the first pulse of the window signal.

2. The method as claimed in claim 1, further comprising the step of identifying the interface circuit as a malfunctioning interface circuit in response to the microprocessor not receiving the first edge of the enable signal at a predetermined point in every time period of a predetermined duration.

3. The method as claimed in claim 1, further comprising the steps of:

monitoring at least one parameter of a circuit element for a predetermined time interval in every time period of a predetermined duration before the step of transmitting a first edge of an enable signal; and adjusting the at least one parameter in response to the at least one parameter exceeding a predetermined limit corresponding to the at least one parameter.

4. The method as claimed in claim 1, further comprising the step of transmitting a second edge of the enable signal to the microprocessor in response to the interface circuit receiving the first edge of the first pulse of the window signal.

5. The method as claimed in claim 1, further comprising the steps of:

transmitting a first edge of at least one pulse of the window signal to the interface circuit after the step of transmitting a second edge of the first pulse of the window signal;

transmitting a second edge of the at least one pulse of the window signal to the interface circuit;

monitoring at least one parameter of a circuit element in response to the interface circuit receiving the first edge of the at least one pulse of the window signal;

transmitting at least one data signal generated using the at least one parameter to the microprocessor;

transmitting a first edge and a second edge of at least one pulse of the command signal to the interface circuit in response to the microprocessor initiating at least one command; and executing the at least one command in response to the interface circuit receiving the first edge of the at least one pulse of the command signal after receiving the first edge of the at least one pulse of the window signal and before receiving the second edge of the at least one pulse of the window signal.

6. The method as claimed in claim 5, wherein the step of executing the at least one command includes the steps of:

accepting the at least one command in response to the interface circuit receiving the at least one pulse of the command signal after receiving the first edge of the at least one pulse of the window signal and before receiving the second edge of the at least one pulse of the window signals;

executing the at least one command at a first predetermined time; and terminating execution of the at least one command at a second predetermined time.

7. The method as claimed in claim 5, wherein the step of executing the first command includes the step of unlocking a command interface in the interface circuit to place the interface circuit in a state ready for executing the at least one command.

8. The method as claimed in claim 7, wherein the step of executing the at least one command includes the step of executing the at least one command in response to the interface circuit completing the step of unlocking the interface circuit and in response to the interface circuit receiving the second edge of the at least one pulse of the command signal after receiving the second edge of the at least one pulse of the window signal.

9. The method as claimed in claim 7, further comprising, after the step of transmitting a second edge of the at least one pulse of the window signal, the steps of:

transmitting a first edge of a terminating pulse of the window signal to the interface circuit; and locking the command interface of the interface circuit in response to the interface circuit receiving the first edge of the terminating pulse of the window signal.

10. A method for communicating between a microprocessor and an interface circuit, comprising the steps of:

transmitting a first edge of an enable signal to the microprocessor at a predetermined point in every time period of a predetermined duration;

transmitting a first edge of a first pulse of a window signal to the interface circuit in response to the microprocessor receiving the first edge of the enable signal;

transmitting a second edge of the first pulse of the window signal to the interface circuit;

transmitting a first data signal to the microprocessor;

transmitting a first pulse of a command signal to the interface circuit in response to the microprocessor initiating an unlock command;

unlocking a command interface of the interface circuit in response to the interface circuit receiving the first pulse of the command signal after receiving the first edge of the first pulse of the window signal and before receiving the second edge of the first pulse of the window signal;

transmitting a first edge of at least one pulse of the window signal to the interface circuit after the step of transmitting a second edge of the first pulse of the window signal;

transmitting a second edge of the at least one pulse of the window signal to the interface circuit;

monitoring at least one parameter of a circuit element in response to the interface circuit receiving the first edge of the at least one pulse of the window signal;

transmitting at least one data signal generated using the at least one parameter to the microprocessor;

transmitting a first edge and a second edge of at least one pulse of the command signal to the interface circuit in response to the microprocessor initiating at least one command;

executing the at least one command in response to the command interface of the interface circuit being unlocked, in response to the interface circuit receiving the first edge of the at least one pulse of the command signal after receiving the first edge of the at least one pulse of the window signal and before receiving the second edge of the at least one pulse of the window signal, and in response to the interface circuit receiving the second edge of the at least one pulse of the command signal after the second edge of the at least one pulse of the window signal; and locking the command interface of the interface circuit.

11. The method as claimed in claim 10, further comprising the step of identifying the interface circuit as a malfunctioning interface circuit in response to the microprocessor not receiving the first edge of the enable signal at the predetermined point in every time period of the predetermined duration.

12. The method as claimed in claim 10, wherein the step of executing the at least one command includes the steps of:

accepting the at least one command in response to the command interface of the interface circuit being unlocked and in response to the interface circuit receiving the at least one pulse of the command signal after receiving the first edge of the at least one pulse of the window signal and before receiving the second edge of the at least one pulse of the window signal;

executing the at least one command at a first predetermined time; and terminating execution of the at least one command at a second predetermined time.

13. The method as claimed in claim 10, wherein the step of locking the command interface includes the steps of:

transmitting a first edge of a terminating pulse of the window signal to the interface circuit after the step of transmitting a second edge of the at least one pulse of the window signal; and locking the command interface in response to the interface circuit receiving the first edge of the terminating pulse of the window signal.

14. The method as claimed in claim 10, wherein the step of executing the at least one command includes the step of interrupting a current flowing into a terminal of the circuit element.

15. The method as claimed in claim 10, wherein the step of executing the at least one command includes the step of establishing a current path within the circuit element.

* * * * *